Nov. 3, 1936.                M. MAYER                2,059,471
                             LOCOMOTIVE
                         Filed Aug. 18, 1934
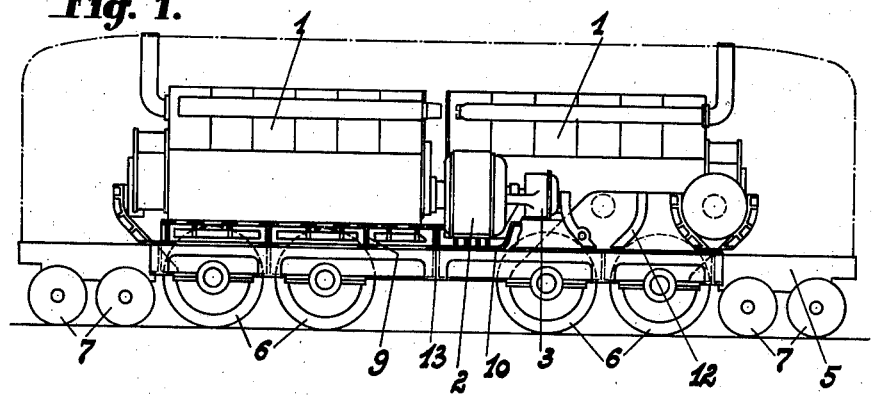
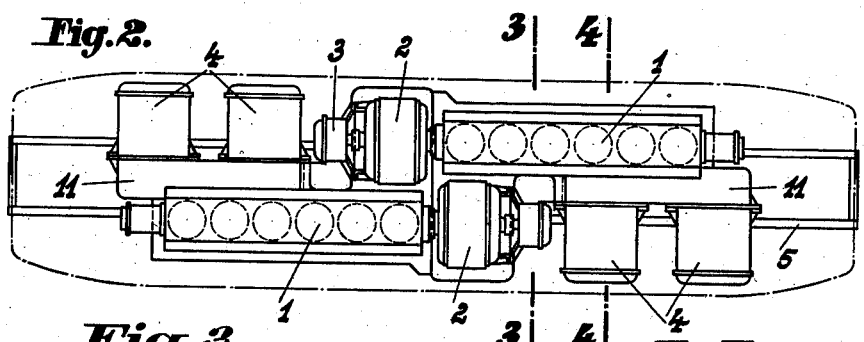
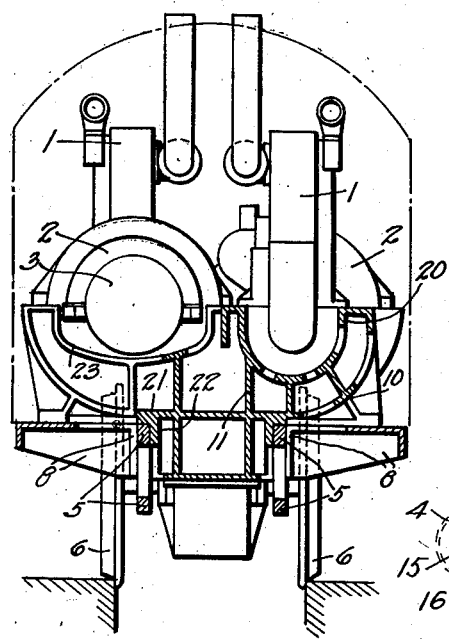
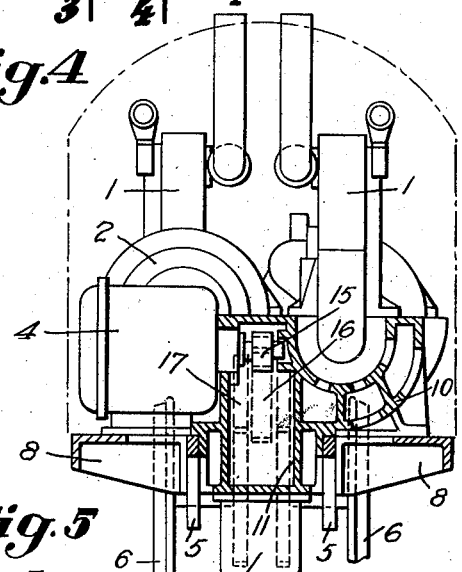
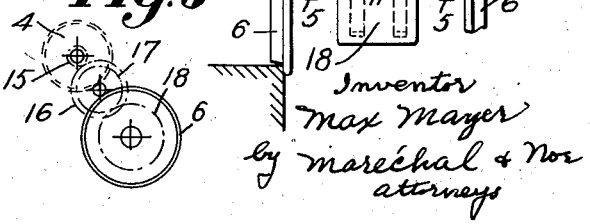
Inventor
Max Mayer
by Maréchal & Noe
attorneys Patented Nov. 3, 1936

2,059,471

UNITED STATES PATENT OFFICE 2,059,471

LOCOMOTIVE

Max Mayer, Augsburg, Germany, assignor to Maschinenfabrik Augsburg-Nurnberg A. G., Augsburg, Germany, a corporation of Germany Application August 18, 1934, Serial No. 740,494
In Germany August 25, 1933

9 Claims. (Cl. 105—35)

This invention relates to engine powered locomotives having electrical transmission to the wheels.

One object of the invention is the provision of an engine driven locomotive in which the power is supplied from the engine electrically through an electric generator and electric motor means operated thereby, the locomotive having a pair of power units so arranged as to distribute the weights of the various machines and to provide a locomotive comparatively small in overall length and width.

Another object of the invention is the provision of an engine driven locomotive having a pair of power units supported on base members so that the engine of one unit is arranged laterally opposite the generator and motor means of the other unit.

Other objects and advantages of the invention will be apparent from the following description, the appended claims and the accompanying drawing, in which,—

Fig. 1 is a side elevation of a locomotive embodying the present invention, showing part of the base structure in section and with one of the electric motors removed;

Fig. 2 is a plan view of the locomotive;

Fig. 3 is a vertical section taken on the line 3—3 of Fig. 2 but showing the combustion engine and generator in elevation and to a larger scale; and Fig. 4 is a section taken on the line 4—4 of Fig. 2 but showing the combustion engine and the driving motor in elevation and to a larger scale.

Fig. 5 is a section through the mechanical gear between driving motor and driving wheels.

In the preferred embodiment of the invention, as herein illustrated, the locomotive is driven by a pair of power units each of which comprises a combustion engine 1, an electric generator 2 coupled thereto and driven thereby and electric motor means 4 energized by the generator, these several parts being arranged end to end at one side of the locomotive and opposite the second unit. Each generator also includes an energizing machine 3. As herein shown the electric motor means of each unit is a pair of electric motors having armatures rotatable about transverse axes, the motors of a unit being connected so as to operate wheel driving mechanism 14 provided in a housing portion 11.

The driving wheels 6 are arranged on the locomotive frame 5 in the usual manner, with the guide wheels 7 provided in front of and behind the driving wheels. The locomotive frame 5 and the bracket or pedestal members 8 which are fixed to the frame members 5 support two bases 9 and 10, which abut one another in a transverse vertical plane as indicated at 13, at a location substantially midway between the front and rear ends of the locomotive where the are bolted together. Each base is of a skelton character, having engine supporting walls 20 and horizontal and vertical wall portions 21 and 22 respectively which are secured over and between the longitudinally extending spaced frame members 5 of the locomotive. Adjacent the generator supporting portion of the frame, the latter is extended as indicated at 23 in Fig. 3, thus providing a support extending up some distance above the top of the locomotive frame members 5 and reaching under the ends of the generator. These bases 9 and 10 provide the housings or boxes 11 for the reception of the wheel driving mechanism which connect the motors 4 to the driving wheels. Pinion 15 on the shaft of motor 4 drives the gear wheel 16 arranged on the same shaft with gear wheels 17. The gear wheels 17 drive gear wheels 18 fitted to the same axle as the driving wheels 6. The boxes or housings 11 of the bases are provided with flanges 12 as shown in Fig. 1 to which the flanges of the motors are directly bolted, Fig. 1 showing the left-hand motor 4 removed for purpose of illustration of the motor support.

The engines 1 are each multi-cylinder internal combustion engines preferably having their cylinders arranged in line. These engines may be high powered two or four cycle Diesel engines or the like, so as to provide a total effective brake horse power of some 1500 to 3000 or above. The two engines are longitudinally displaced, as will be apparent from Fig. 2, each engine being arranged at one side of the generator 2, motors 4, and wheel driving mechanism 14 of the other power unit. Each base member 9 or 10 supports one engine and the electrical system and wheel drive mechanism of the other unit, providing a space at one side of the engine through which the operator may pass to afford convenience for inspection and repairing during operation of the locomotive. The top of the housings 11 provide frame walls over which the operator can walk.

The arrangement of the various machines on the locomotive and the construction of the base members results in an extremely favorable utilization of the available space in the locomotive, making it possible to provide for the supply of an unusually large amount of power to the driving wheels, and making it possible to maintain a prescribed minimum length and width of the locomotive and to maintain the normal axle arrangement. The various parts are arranged quite compactly, but all of the machines are readily accessible. The two bases are preferably identical in construction so that they are readily produced and readily stored.

The arrangement as herein described avoids the difficulties of other arrangements. Arranging two driving engines side by side would result in a locomotive width exceeding that of an equally powerful steam locomotive. The use of single engines with their cylinders arranged in line would have the disadvantage of unfavorable weight distribution of the power plant and electrical system inasmuch as the very heavy generator would have to be arranged at the end of the locomotive and above the driving wheels or end turning frames of the locomotive while the comparatively light engine would be in the middle of the locomotive, giving an unfavorable weight distribution such as would prevent quiet running especially at high speed. If the two engines were arranged side by side, the space required for the scavenging air and exhaust lines within the restricted locomotive profile would afford practically no passageway between the engines for the operator. Furthermore the arrangement of the present invention permits a very satisfactory positioning of the electric motors as these motors are neither arranged below the locomotive between the axles nor at entirely one end of the locomotive, the present arrangement permitting the normal axial arrangement to be maintained, so that adjacent driving wheels can be spaced a desired minimum distance apart.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An engine driven locomotive comprising a frame, driving wheels supporting said frame, and a pair of power units supported on said frame each of which comprises a combustion engine, an electric generator operated thereby and electric motor means operated by said generator, the engines extending in parallel planes with the generator and motor means of each unit laterally opposite the engine of the other unit, and means connecting said motor means to said driving wheels.

2. An engine driven locomotive comprising a frame, driving wheels supporting said frame, and a pair of power units supported on said frame of like construction and symmetrically disposed on the locomotive, each unit comprising a combustion engine, an electric generator in line therewith and operated thereby and electric motor means operated by said generator, the engines extending in parallel planes with the generator and motor means of each unit laterally opposite the engine of the other unit, and means connecting said motor means to said driving wheels.

3. A high powered engine driven locomotive having a pair of power units each of which comprises a Diesel engine having its cylinders arranged in line, an electric generator operated thereby and electric motor means operated by said generator and arranged at a side of the locomotive, the engines being axially displaced and extending in parallel planes with the generator and motor means of each unit arranged in line with the engine of the same unit and laterally opposite the engine of the other unit.

4. An engine driven locomotive comprising a frame, a pair of power units each of which comprises a combustion engine, an electric generator operated thereby and electric motor means operated by said generator, and a plurality of bases carried by said frame and each supporting the generator and motor means of one unit and the engine of the other unit in laterally opposed relationship thereon.

5. An engine driven locomotive comprising a frame, a pair of power units each of which comprises a combustion engine, an electric generator operated thereby and electric motor means operated by said generator arranged end to end at one side of the locomotive, and a pair of bases each supporting the generator and motor means of one unit and the engine of the other unit in laterally opposed relationship, said bases arranged end to end on said frame and connected together substantially midway between the front and rear ends of the locomotive.

6. An engine driven locomotive comprising a frame, a pair of power units each of which comprises a combustion engine, an electric generator operated thereby, electric motor means operated by said generator and wheel driving mechanism operated by said motor means, and a pair of bases carried by said frame each supporting the generator, motor means and wheel driving mechanism of one unit and the engine of the other unit, each base providing a housing enclosing the wheel driving mechanism supported thereby.

7. An engine driven locomotive comprising a frame, a pair of power units each of which comprises a combustion engine, an electric generator operated thereby, electric motor means operated by said generator and wheel driving mechanism operated by said motor means, and a pair of bases carried by said frame each supporting the generator, motor means and wheel driving mechanism of one unit and the engine of the other unit, each base providing a housing enclosing the wheel driving mechanism supported thereby, said housing having an upper wall forming a passageway at a side of the engine.

8. A high powered engine driven locomotive comprising a frame, a pair of power units carried by said frame, each of said units comprising a multi-cylinder engine, an electric generator operated thereby, electric motor means operated by said generator and wheel driving mechanism operated by said motor means, the engine, generator, and motor means of each unit being arranged in line above said frame, the engines extending in parallel planes with the generator, motor means, and wheel driving mechanism of each unit laterally opposite the engine of the other unit.

9. A high powered engine driven locomotive comprising a frame, driving wheels supporting said frame, and a pair of power units mounted on said frame each of which comprises a combustion engine having its cylinders arranged in line, an electric generator operated thereby, electric motor means operated by said generator and wheel driving mechanism operated by said motor means, the engines extending in parallel planes with said generator, said motor means, and said wheel driving mechanism of each unit laterally opposite the engine of the other unit.

MAX MAYER.